(12) United States Patent
Nasli Bakir et al.

(10) Patent No.: US 12,071,518 B2
(45) Date of Patent: Aug. 27, 2024

(54) PROCESS FOR PREPARING A RESIN

(71) Applicant: Stora Enso OYJ, Helsinki (FI)

(72) Inventors: Ben Nasli Bakir, Saltsjö-boo (SE); Katarina Hägg, Bromma (SE)

(73) Assignee: Stora Enso OYJ, Helsinki (FI)

( * ) Notice: Subject to any disclaimer, the term of this patent is extended or adjusted under 35 U.S.C. 154(b) by 729 days.

(21) Appl. No.: 17/280,409

(22) PCT Filed: Oct. 7, 2019

(86) PCT No.: PCT/IB2019/058509
§ 371 (c)(1),
(2) Date: Mar. 26, 2021

(87) PCT Pub. No.: WO2020/075032
PCT Pub. Date: Apr. 16, 2020

(65) Prior Publication Data
US 2022/0002500 A1 Jan. 6, 2022

(30) Foreign Application Priority Data
Oct. 8, 2018 (SE) .................... 1851222-8

(51) Int. Cl.
*C08H 6/00* (2010.01)
*C08H 7/00* (2011.01)
*C08L 97/00* (2006.01)

(52) U.S. Cl.
CPC .............. *C08H 6/00* (2013.01); *C08L 97/005* (2013.01)

(58) Field of Classification Search
None
See application file for complete search history.

(56) References Cited

U.S. PATENT DOCUMENTS

| | | | | |
|---|---|---|---|---|
| 3,720,531 A * | 3/1973 | Makino | ................... | C01B 33/12 106/482 |
| 3,910,873 A * | 10/1975 | Lin | ................... | C08H 6/00 516/47 |
| 4,732,572 A * | 3/1988 | Dilling | ................... | C08H 6/00 8/557 |
| 4,751,247 A * | 6/1988 | Dilling | ................... | C09D 11/03 514/975 |
| 4,797,157 A * | 1/1989 | Dilling | ................... | C08H 6/00 106/31.75 |
| 4,891,070 A * | 1/1990 | Dilling | ................... | C09D 11/08 106/31.75 |
| 4,957,557 A * | 9/1990 | Dimitri | ................... | C08H 6/00 106/501.1 |
| 5,008,378 A * | 4/1991 | Dimitri | ................... | C08H 6/00 106/238 |
| 5,021,531 A * | 6/1991 | Schroeder | ................ | C08H 6/00 527/403 |
| 5,026,808 A * | 6/1991 | Schroeder | ............. | C09J 197/005 527/403 |
| 5,177,169 A * | 1/1993 | Schroeder | ............. | C09J 197/005 530/502 |
| 9,464,219 B2 * | 10/2016 | Pietarinen | ............... | C08L 97/02 |
| 2013/0085269 A1 | 4/2013 | Delmas et al. | | |
| 2014/0186627 A1 * | 7/2014 | Pu | ................... | C07G 1/00 428/402 |
| 2014/0357847 A1 * | 12/2014 | Wallmo | ............. | D21C 11/0007 530/507 |
| 2015/0166836 A1 * | 6/2015 | Liu | ................... | C07G 1/00 524/76 |
| 2015/0310951 A1 * | 10/2015 | Lu | ................... | G21F 9/28 405/128.7 |

FOREIGN PATENT DOCUMENTS

| | | |
|---|---|---|
| CN | 105714590 A | 6/2016 |
| EP | 2758457 A1 | 7/2014 |
| WO | 2006031175 A1 | 3/2006 |
| WO | 2013144454 A1 | 10/2013 |
| WO | 2015079107 A1 | 6/2015 |
| WO | 2017163163 A1 | 9/2017 |

OTHER PUBLICATIONS

Fabrication of Environmentally Biodegradable Lignin Nanoparticles, Frangville et al., ChemPhysChem 2012, 13, 4235-4243 (Year: 2012).*
PH of Drinking Water, Water research center, 2015-2023, p. 1-8 (Year: 2015).*
International Search Report from corresponding PCT application No. PCT/IB2019/058509 dated Dec. 13, 2019.

* cited by examiner

*Primary Examiner* — Peter A Salamon
(74) *Attorney, Agent, or Firm* — Greer, Burns & Crain, Ltd.

(57) ABSTRACT

The present invention relates to an improved process for preparing an aqueous dispersion of lignin and the use of said suspension in the preparation of a resin.

16 Claims, No Drawings

PROCESS FOR PREPARING A RESIN

This application is a U.S. National Phase under 35 U.S.C. § 371 of International Application No. PCT/IB2019/058509, filed Oct. 7, 2019, which claims priority under 35 U.S.C. §§ 119 and 365 to Swedish Application No. 1851222-8, filed Oct. 8, 2018.

FIELD OF THE INVENTION

The present invention relates to an improved process for preparing an aqueous dispersion of lignin and the use of said dispersion in the preparation of a resin.

The lignin dispersion prepared according to the process of the present invention can be used to manufacture lignin-based resins, such as lignin-based phenolic resins, which are particularly useful for example in the manufacture of laminates, plywood, laminated veneer lumber, oriented strand board and insulation.

BACKGROUND

Lignin, an aromatic polymer, is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network, has been extensively investigated as a suitable substitute for phenol during production of phenol-formaldehyde adhesives. These are used during manufacturing of structural wood products such as plywood, oriented strand board and fiberboard. During synthesis of such adhesives, phenol, partially/all replaced by lignin, is reacted with formaldehyde in the presence of either basic or acidic catalyst to form a highly cross-linked aromatic resins termed novolacs (when utilizing acidic catalysts) or resoles (when utilizing basic catalysts).

One problem when preparing resins comprising lignin is to ensure that the inherent reactivity of the lignin is fully utilized by adequately suspending or dissolving it in a suitable liquid medium. In the prior art, this has generally been solved by using alkali in the aqueous medium to which lignin is added.

EP2758457 is directed to a method involving the steps of forming, under heating at a temperature of 30-70° C., an aqueous dispersion comprising alkali and lignin, wherein the alkali comprises a hydroxide of an alkali metal, and heating the dispersion formed at a temperature of 50-95° C. for producing alkalated lignin.

In prior art methods for preparing resins comprising lignin, alkali is added to an aqueous medium to which lignin is subsequently added. Since lignin is typically provided in the form of a dry powder, the addition of lignin to the aqueous medium may lead to splashing, i.e. when lumps of dry powder lignin is dropped into the aqueous medium in a tank or reactor, alkaline medium may splash which may involve safety risks when carrying out the addition of the lignin.

There is a need to facilitate the process for preparing a dispersion of lignin in an aqueous medium, particularly for preparation of resins.

SUMMARY OF THE INVENTION

It has now surprisingly been found that a dispersion of lignin can be prepared without adding alkali to the aqueous medium in which the lignin is dispersed. In addition, it has surprisingly been found that a dispersion can be obtained without applying heating to the aqueous medium.

The present invention is thus directed to a method for preparing a dispersion of lignin in an aqueous medium, comprising the steps of
  a) providing an aqueous medium having a pH of 1 to 7;
  b) adding lignin to the aqueous medium, wherein the lignin is added in the form of a slurry having a solid content of lignin in the range of from 30 wt-% to 95 wt-%, calculated based on the total weight of the slurry;
  c) mixing until a dispersion of lignin in the aqueous medium has been obtained.

To prepare a resin, steps a) to c) are followed by the following steps:
  d) adding alkali, phenol and/or formaldehyde to the dispersion;
  e) maintaining the mixture of step d) at a temperature of from 30° C. to 95° C. for at least 30 minutes.

The present invention is thus also directed to resins and the use of said resins in the manufacture of laminates, plywood, oriented strand board (OSB), laminated veneer lumber (LVL), insulation and other engineered wood products. The present invention is also directed to such laminates and engineered wood products manufactured using said resins.

DETAILED DESCRIPTION

It is intended throughout the present description that the expression "lignin" embraces any kind of lignin, e.g. lignin originated from hardwood, softwood or annular plants. Preferably the lignin is an alkaline lignin generated in e.g. the Kraft process. The lignin may then be separated from the black liquor by using the process disclosed in WO2006031175.

As used herein, the term "dispersion" refers to a composition in which particles are dispersed in a continuous phase of a different composition than the particles. This is different from a "solution", which generally refers to a homogenous mixture. As used herein, the term "slurry" refers to a composition comprising solid material and a liquid. The solid material is unevenly distributed in the liquid and contains agglomerates of solid material. The size of the agglomerates may vary.

The method or process according to the present invention can be carried out batchwise or continuously.

The pH of the aqueous medium of step a) is from 1 to 7, such as from 2 to 7 or 6 to 7 or 2 to 5.

The dispersion obtained in step c) may be prepared and subsequently stored before step d) is carried out. The dispersion obtained in step c) may also be moved or shipped to another location at which step d) may be carried out. Thus, according to the present invention, the dispersion being stored, moved or shipped has been prepared such that the pH in step a) is from pH 1 to 7. Thus, according to the present invention, the dispersion being stored, moved or shipped has been prepared without addition of alkali. If sedimentation would occur after the dispersion of step c) has been stored for an extended period of time, briefly stirring the mixture prior to performing step d) may be advantageous.

The dispersion obtained in step c) may thus be prepared outside the reactor in which the subsequent steps take place. Alternatively, steps a) to c) can be carried out in the same reactor in which the subsequent steps take place. Alternatively, the dispersion of obtained in step c) can be prepared separately from the reactor in which the subsequent steps take place and be transported to the reactor using e.g. a pump, for example if the process according to the present invention is to be carried out continuously.

The aqueous medium in step a) may, in addition to water, comprise up to a total of 10 wt % solvent, such as an alcohol, such as ethanol, methanol or ethylene glycol. However, the pH of the aqueous medium in step a) is in the range of from 1 to 7, preferably 2 to 7 or 6 to 7 or 2 to 5.

The aqueous medium in step a) may, in addition to water, comprise up to a total of 15 wt %, such as 10 wt % additives, such as urea, a thickener or a tenside. However, the pH of the aqueous medium in step a) is in the range of from 1 to 7, preferably 2 to 7 or 6 to 7 or 2 to 5.

In step b), the lignin is added in the form of a slurry having a solid content of lignin in the range of from 30 wt-% to 95 wt-%, calculated based on the total weight of the slurry. Preferably, the solid content is in the range of from 40 wt-% to 80 wt-%, calculated based on the total weight of the slurry. More preferably, the solid content is in the range of from 50 wt-% to 75 wt-%, calculated based on the total weight of the slurry. Preferably, the slurry is aqueous. Preferably, the aqueous phase of the slurry has a pH in the range of from 1 to 7, preferably 2 to 7 or 6 to 7 or 2 to 5. The slurry used preferably comprises lignin that has been separated from black liquor generated in the Kraft process. Preferably, the lignin has been separated from the black liquor using the Lignoboost process.

Preferably, the lignin slurry used in step b) has been subjected to sieving before being used in step b). Optionally, the lignin in the slurry or the slurry has also been subjected to a grinding and/or crushing operation, to reduce the size of lignin agglomerates prior to step b). The cursing and/or grinding may take place before or after the sieving, preferably before the sieving. Preferably, the slurry contains less than 10 wt-%, calculated based on the dry weight of the lignin, of lignin agglomerates or particles having a diameter larger than 15 mm. More preferably, the slurry contains less than 5 wt-%, calculated based on the dry weight of the lignin, of lignin agglomerates or particles having a diameter larger than 15 mm. Even more preferably, the slurry contains less than 5 wt-%, calculated based on the dry weight of the lignin, of lignin agglomerates or particles having a diameter larger than 10 mm. Most preferably, the slurry contains less than 5 wt-%, calculated based on the dry weight of the lignin, of lignin agglomerates or particles having a diameter larger than 5 mm Steps a), b) and c) in the process according to the present invention are preferably carried out without actively heating the aqueous medium. Thus, the aqueous medium is preferably at room temperature, such as at a temperature of 15-25° C. at the time of adding the lignin. Alternatively, steps a), b) and c) according to the present invention are carried out at a temperature of up to 40° C., such as from 15° C. to 40° C.

Alkali is not added to the aqueous medium until in step step d), i.e. after a dispersion of lignin in the aqueous medium has been obtained. After the addition of alkali, the aqueous medium comprises 5-50 wt % alkali, such as 10-50 wt % alkali, such as 40-50 wt % alkali. In one embodiment of the present invention, the pH of the aqueous medium after addition of lignin and alkali is at least pH 8, such as at least pH 10, such as at least pH 12 or at least pH 13.

The alkali is preferably sodium hydroxide, potassium hydroxide, calcium hydroxide, magnesium hydroxide or a mixture thereof.

The addition of alkali, phenol and/or formaldehyde in step d) can be carried out in any order. Each component may for example be added consecutively or at the same time as one or two of the other components. In one embodiment, the components are added in such a way that a part of the total amount of each component is added and one or more additional amounts of each component is subsequently added. Preferably, at least alkali and phenol are added in step d), in any order. More preferably, alkali, phenol and formaldehyde are added in step d), in any order.

In one embodiment of the invention, the dispersion in step c) comprises 5-60 wt %, such as 5-50 wt % lignin, such as 35-50 wt % lignin.

The present invention also relates to a resin composition obtainable by the process according to the present invention. The resin composition is preferably a lignin-phenol-formaldehyde resin.

The resin obtained is useful for example in the manufacture of laminates. The resin is then impregnated into and/or applied between the sheets that should form the laminate and said sheets are pressed together and heated at a temperature of about 130-150° C.

The present invention also relates to the use of the resin composition in engineered wood products such as plywood, particle board, wafer board, gluelam beams, structural composite lumber, oriented strand board (OSB), oriented strand lumber (OSL), laminated veneer lumber (LVL) and other applications such as laminates, insulation and molding compounds.

Examples 713 g lignin (kraft lignin, sieved and having particle size <10 mm, 65% purity) was added to 726 g water at room temperature. The mixture was stirred for approximately 20 minutes until the lignin was dispersed in the water. The pH of the mixture was about 3.

240 g of sodium hydroxide was added to the mixture and the mixture was stirred for about 40 minutes. The temperature of the mixture increased after the addition of sodium hydroxide (exothermic). After stirring of the mixture for about 60 minutes the pH was about 13. 472 g of phenol and 796 g of formalin (52.5%) was added to the mixture. The mixture was heated to about 80° C.

181 g of sodium hydroxide was added to the mixture and the temperature was adjusted to about 75° C.

The reaction was monitored and continued until a viscosity of about 250-400 cp (measured at 25° C.) was reached. The mixture was cooled to 25° C. and the viscosity was measured. The geltime at 100° C. was about 50 min and the solid content was about 45 wt-%.

In view of the above detailed description of the present invention, other modifications and variations will become apparent to those skilled in the art. However, it should be apparent that such other modifications and variations may be effected without departing from the spirit and scope of the invention.

The invention claimed is:

1. A method for preparing a lignin dispersion comprising the steps of
a) providing an aqueous medium having a pH of 1 to 7;
b) adding lignin to the aqueous medium, wherein the lignin is added in a form of a slurry having a solid content of lignin in a range of from 30 wt-% to 95 wt-%, calculated based on a total weight of the slurry; and,
c) mixing the aqueous medium until a dispersion of lignin in the aqueous medium has been obtained,
wherein steps a), b), and c) are carried out without actively heating the aqueous medium, and wherein the dispersion is not actively heated after step c).

2. A method for preparing a resin comprising the steps of
a) providing an aqueous medium having a pH of 1 to 7;
b) adding lignin to the aqueous medium, wherein the lignin is added in a form of a slurry having a solid content of lignin in a range of from 30 wt-% to 95 wt-%, calculated based on a total weight of the slurry;
c) mixing the aqueous medium until a dispersion of lignin in the aqueous medium has been obtained;
d) adding alkali, phenol, and formaldehyde to the dispersion; and
e) maintaining a mixture formed in step d) at a temperature of from 30° C. to 95° C. for at least 30 minutes.

3. The method according to claim 1, wherein an amount of lignin in the dispersion in step c) is 5-60 wt %.

4. The method according to claim 3, wherein the amount of lignin in the dispersion in step c) is 35-60 wt %.

5. The method according to claim 1, wherein the pH of the aqueous medium in step a) is between 2 to 5.

6. The method according to claim 1, wherein the slurry used in step b) has been subjected to sieving prior to being used in step b).

7. The method according to claim 6, wherein the slurry used in step b) contains less than 10 wt-%, calculated based on a dry weight of the lignin, of lignin agglomerates or particles having a diameter larger than 15 mm.

8. A dispersion obtained by the method of claim 1.

9. A resin obtained by the method of claim 2.

10. A laminate, engineered wood product, or insulation product manufactured with the resin according to claim 9.

11. The method according to claim 2, wherein steps a), b), and c) are carried out without actively heating the aqueous medium.

12. The method according to claim 2, wherein an amount of lignin in the dispersion in step c) is between 5-60 wt %.

13. The method according to claim 12, wherein the amount of lignin in the dispersion in step c) is between 35-60 wt %.

14. The method according to claim 2, wherein the pH of the aqueous medium in step a) is between 2 to 5.

15. The method according to claim 2, wherein the slurry used in step b) has been subjected to sieving prior to being used in step b).

16. The method according to claim 15, wherein the slurry used in step b) contains less than 10 wt-%, calculated based on a dry weight of the lignin, of lignin agglomerates or particles having a diameter larger than 15 mm.

* * * * *